3 Sheets—Sheet 1.
J. MACLURE.
HARNESS-SADDLE.
No. 170,871. Patented Dec. 7, 1875.
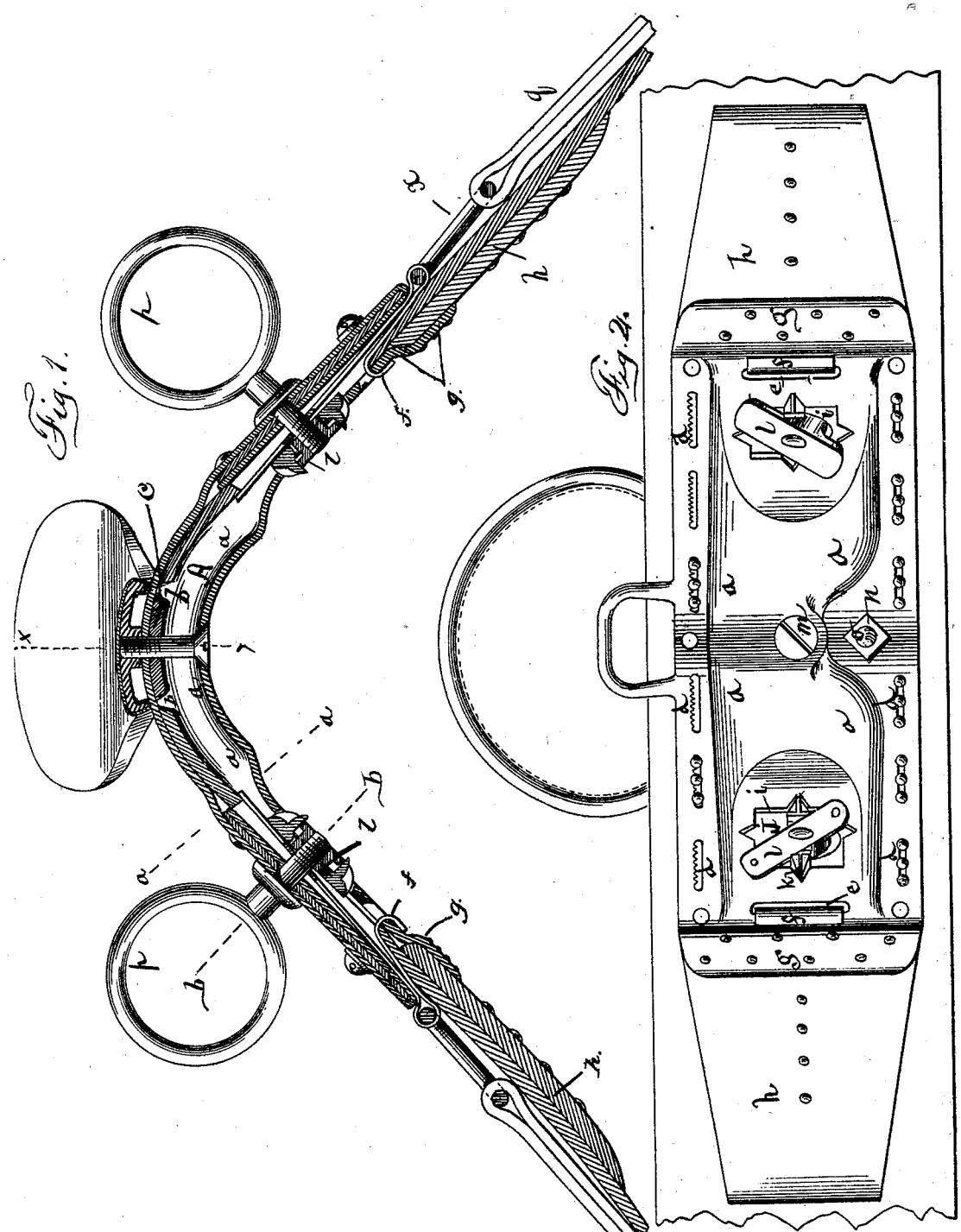
Witnesses:
Christian G. Moritz
John Fahrer
John Maclure,
by attys,
Clayton Bros.

3 Sheets—Sheet 2.
J. MACLURE.
HARNESS-SADDLE.
No. 170,871. Patented Dec. 7, 1875.
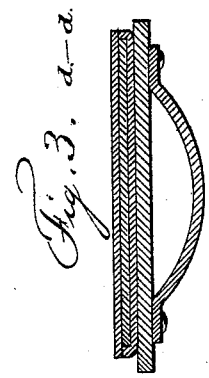
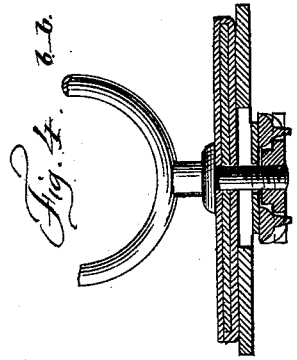
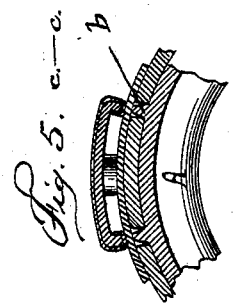
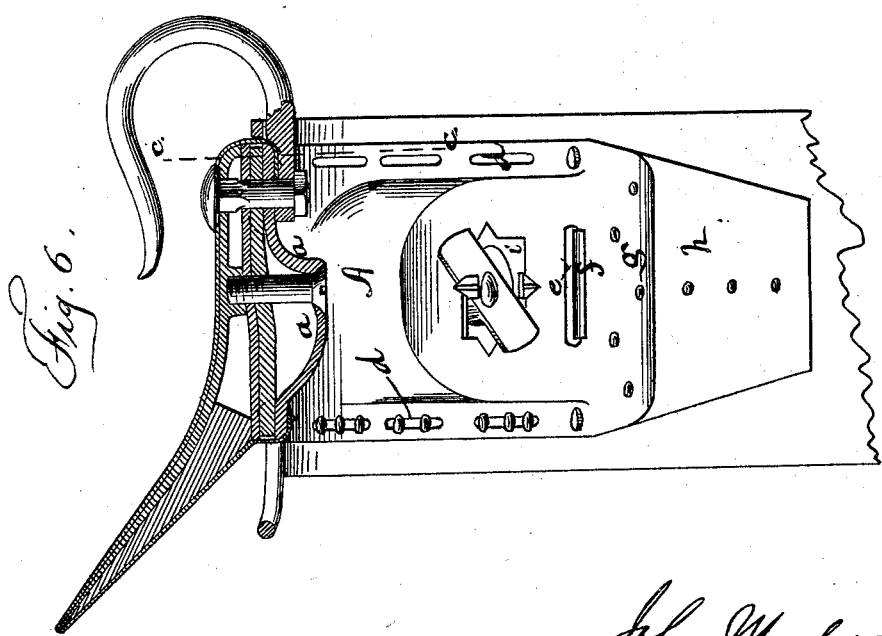
Witnesses:
Christian G. Moritz
John Fahrer
John Maclure,
by atty's,
Clayton Bros.

3 Sheets—Sheet 3.
J. MACLURE.
HARNESS-SADDLE.
No. 170,871. Patented Dec. 7, 1875.
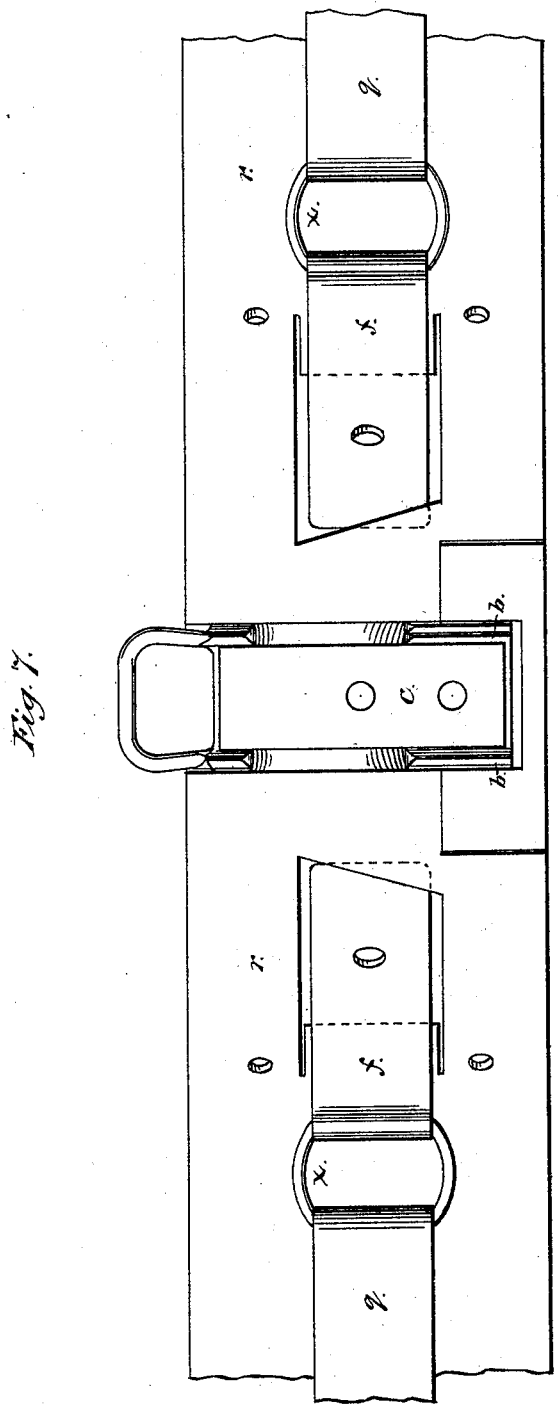
Witnesses:
John D. Hyer
Chas. H. Kelly
Inventor:
John Maclure
by attys
Clayton Bro-
N. PETERS, PHOTO-LITHOGRAPHER, WASHINGTON, D.C.

UNITED STATES PATENT OFFICE.

JOHN MACLURE, OF NEWARK, NEW JERSEY, ASSIGNOR TO EDWIN R. CAHOONE, OF SAME PLACE.

IMPROVEMENT IN HARNESS-SADDLES.

Specification forming part of Letters Patent No. 170,871, dated December 7, 1875; application filed October 19, 1875.

*To all whom it may concern:*

Be it known that I, JOHN MACLURE, of Newark, Essex county, in the State of New Jersey, have invented certain new and useful Improvements in Harness-Saddles; and I do hereby declare that the following is a full, clear, and exact description thereof, reference being had to the accompanying drawings forming a part of this specification.

My invention chiefly consists in the following features: First, in providing the crown of the arch of the tree with the two nearly parallel ridges, for the reception of a straight piece of leather, commonly called a "middle-leather," thus adding strength to the tree, and saving in labor and leather in "working" the saddle. Second, in providing the outer edges of the sides of the tree with one or more long and narrow slots for the passage of the tacks which may be used for fastening the flap-leathers to the tree. The edges of these slots may be indented to retain the tacks from lateral movement. In casting trees it is easier to cast with a few long slots than with a number of circular holes. In the latter case the metal does not flow so easily, and the working saddler usually has to punch through the imperfect holes at considerable waste of time. Third, in providing each end of the tree with a transverse jog or depression extending across it, and about a quarter of an inch below the bed of the backband, for the purpose of attaching a leather "stiffener" of greater width and thickness than usual. Fourth, in providing the tree with a transverse slotted hole about half an inch above the jog for the stiffener, and running crosswise of the backband-bed, for the purpose of receiving the hook of the backband-iron, and, in combination with this slot, using a hooked backband-iron, which is secured by the terret at one end, and by this slot and hook at the other, so as to divide the strain, which all usually comes upon the terret; also, this arrangement permits of a simpler method of making the backband-iron, which may be a simple piece of strap metal bent into the desired shape, requiring no rivet to secure the "dee." Fifth, in the construction and arrangement of the socket-plate and terret-nut, so as to readily change the terrets of a finished saddle without touching the pad or under surface of the tree.

Figure 1 is a longitudinal vertical section of a tree having in place its jockeys, flaps, seat, terrets, nuts, backbands, and backband-straps, but without any padding or "housing." Fig. 2 is a plan of the under side of the same. Fig. 3 is a section through line $x\,x$ of Fig. 6. Figs. 4 and 5 are, respectively, sections through lines $a\,a$ and $b\,b$ of same. Fig. 6 is a section through line $c\,c$ of Fig. 2. Fig. 7 is a top view, the seat, jockeys, and terrets removed.

In the drawings, A represents the main frame or metal "tree," which is stamped, pressed, swaged, cast, or otherwise formed out of iron or other suitable metal. This tree is so formed, just below and near the center, as to be concave, having a double-arched form, as clearly shown by the concavity $a$. (Shown in Figs. 1, 2, and 6.) At $b\,b$ are shown the two ridges on top of the crown of the tree A, for the reception of a straight piece known as the "middle-leather" $c$. At $d\,d$ are shown the slotted holes (with indentations) for tacking on the flaps. At $e\,e$ are the slotted openings to engage the backband-hook, which is marked $f$. At $g\,g$ are shown the jogs, to receive and support the broad stiffener $h$. At $i\,i$ is shown the socket-hole in the bed of the tree. $j\,j$ are the socket-plates, having the pins or studs $k$, to prevent turning; $l\,l$, the terret-nuts; $m$, the main screw, to secure the seat to the tree; $n$, the water-hook, and $o$ the screw securing it to the tree; $p$, the terrets; $q$, the backband; $r$, the flap. $x$ is the "dee," held in the loop of the metal backband $f$, and also in the loop of the leather backband.

The construction and arrangement and operation of my invention, and all its parts, are so fully, and in detail, shown in the drawings as to render further description needless.

My invention has, among its advantages, cheapness, strength, easiness to be worked, and the adaptability to be taken apart and packed closely for shipment.

What I claim as my invention, and desire to secure by Letters Patent, is—

1. The ridges $b\,b$ on crown of the tree, substantially as and for the purposes set forth.

2. The long slots *d d*, with indentations, near edges of the tree, substantially as and for the purposes set forth.

3. The holes *e e* in the tree below the terret, in combination with a metal backband-hook.

4. In a jockey-saddle, the jogs *g g*, forming square shoulders, extending across the entire width of the end of the tree, for the reception of the stiffener *h*, as described.

5. The metallic backband-straps *f f*, provided with loop and hook, substantially as and for the purposes set forth.

6. The adjustable socket-plates *j j*, in combination with a metal tree, having socket-hole *i*, a terret and terret-nut, constructed and operating substantially as and for the purposes shown in Figs. 1 and 2.

In testimony that I claim the above improvements in harness-saddles, I have hereunto set my hand this 9th day of October, 1875.

JOHN MACLURE.

In presence of—
 J. C. CLAYTON,
 A. J. DE LACY.